United States Patent
Borck et al.

[15] 3,667,582
[45] June 6, 1972

[54] RADIAL SPRING CLUTCH

[72] Inventors: Howard O. Borck, Detroit; Leo W. Cook, Royal Oak, both of Mich.

[73] Assignee: Borg-Warner Corporation, Chicago, Ill.

[22] Filed: July 27, 1970

[21] Appl. No.: 58,309

[52] U.S. Cl. ..........................192/99 A, 192/70.29, 192/70.3
[51] Int. Cl. ..........................................................F16d 23/00
[58] Field of Search............................192/99 A, 70.29, 70.3

[56] References Cited

UNITED STATES PATENTS

| | | | |
|---|---|---|---|
| 2,765,892 | 10/1956 | Reed | 192/99 A |
| 3,276,555 | 10/1966 | Pheleps et al. | 192/99 A |
| 3,369,640 | 2/1968 | Smirl | 192/99 A |

*Primary Examiner*—Benjamin W. Wyche
*Assistant Examiner*—Randall Heald
*Attorney*—Donald W. Banner, William S. McCurry and John W. Butcher

[57] ABSTRACT

A friction clutch assembly including a driving member, a driven member, a reaction member, a pressure plate, release levers pivotally connected to the reaction member at a point between a front surface of the reaction member and the driving member and pressure springs disposed between the reaction member and the release levers such that upon wear of the friction facing an increase in mechanical advantage is used to maintain a substantially constant pressure plate load while the clutch is engaged regardless of clutch facing wear and upon clutch release a decrease in mechanical advantage is used to reduce operator's efforts.

15 Claims, 8 Drawing Figures

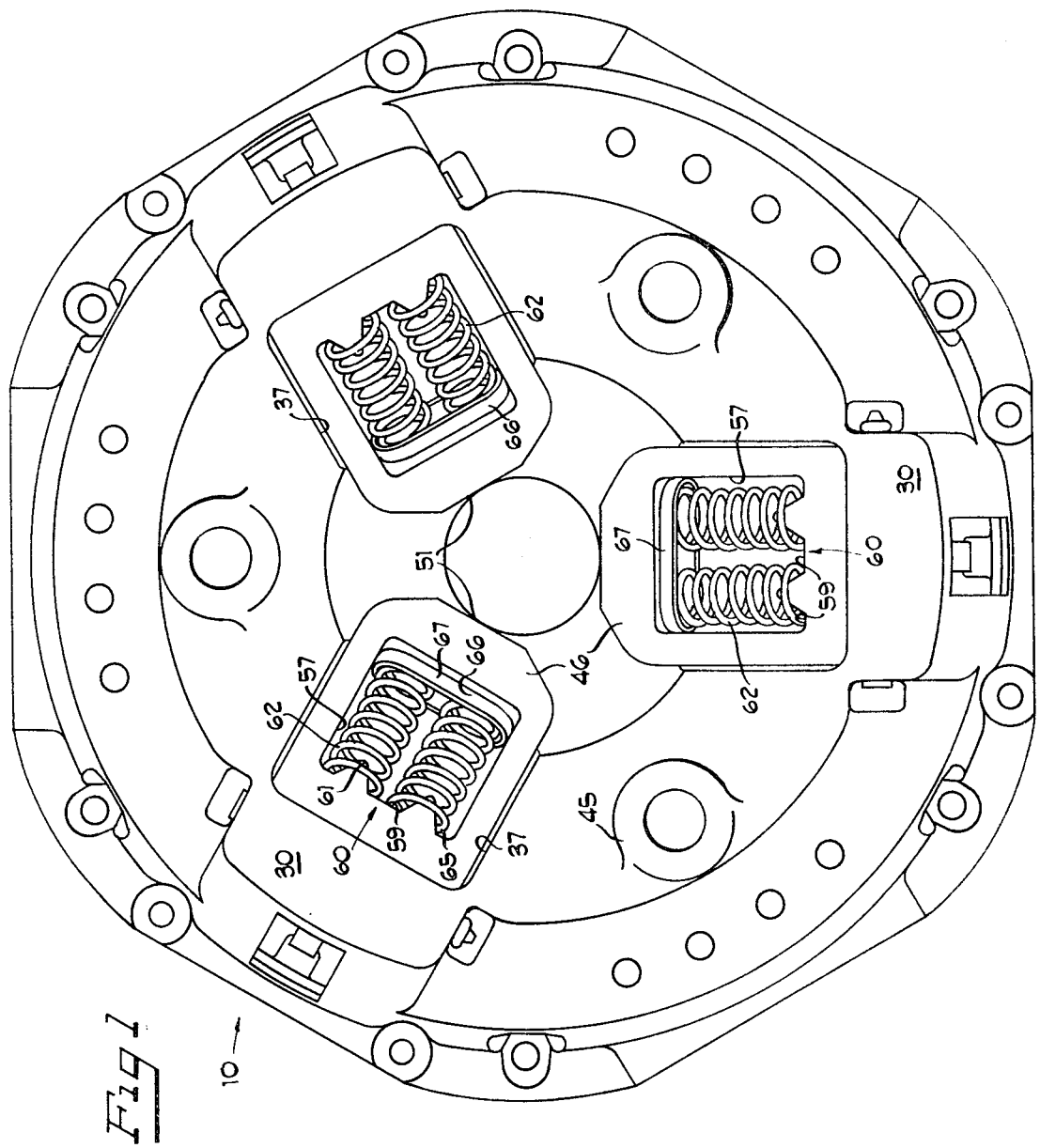

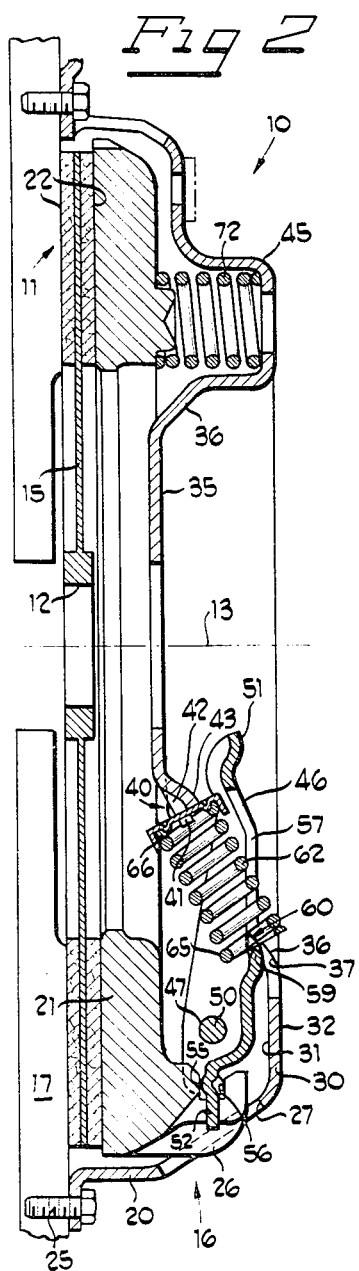
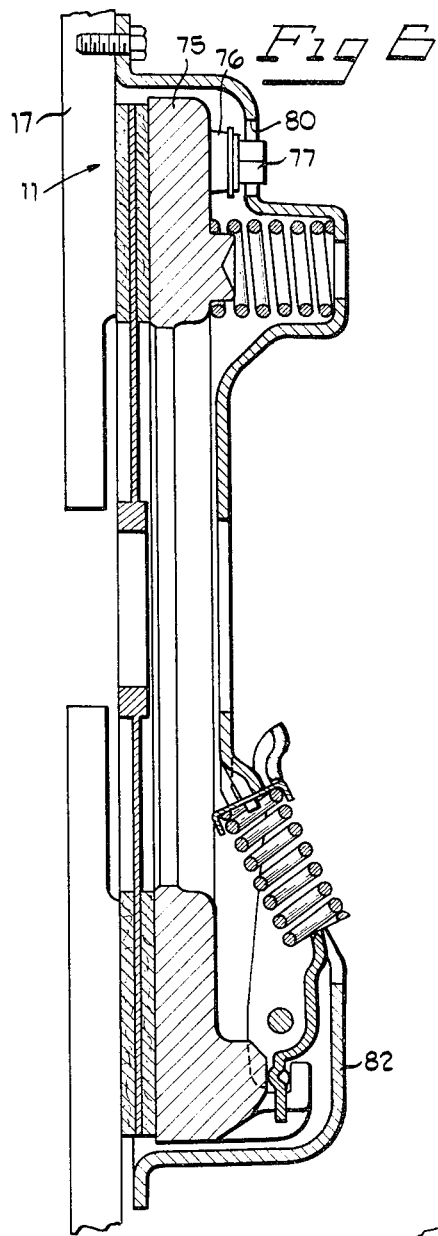
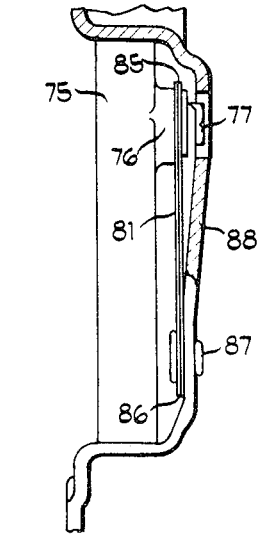
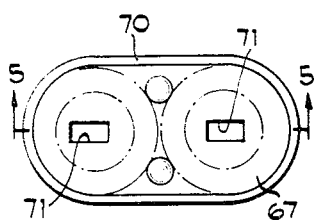
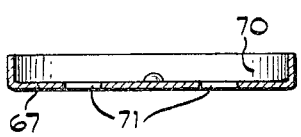
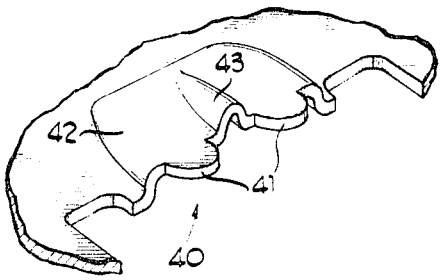
INVENTORS
HOWARD O. BORCK
LEO W. COOK
BY Dennis McWilliams
ATTORNEY

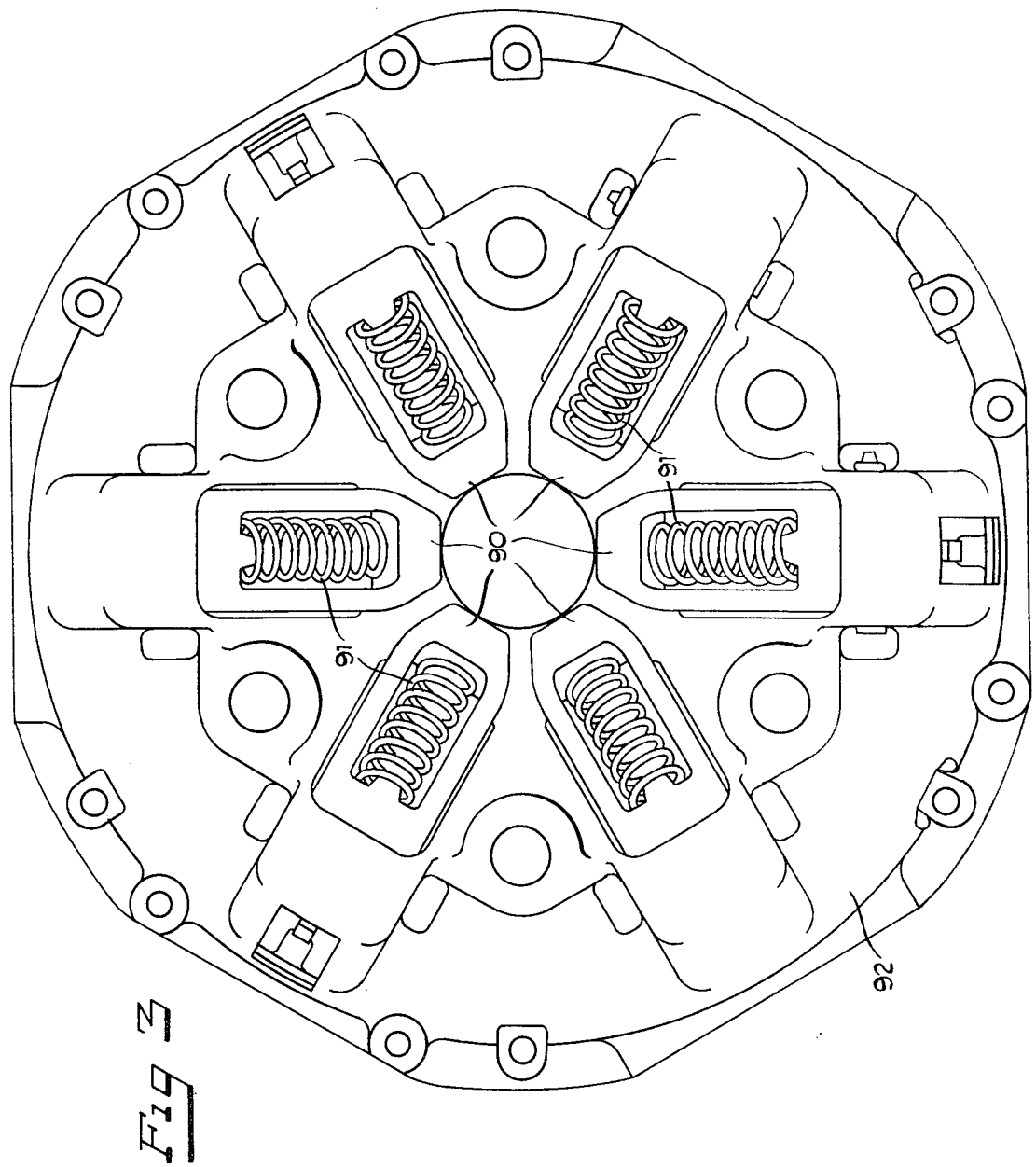

3,667,582

RADIAL SPRING CLUTCH

SUMMARY OF THE INVENTION

This invention relates to friction clutches, and more particularly, to a friction clutch of the type employing coiled pressure springs acting through pivotal levers.

In conventional clutches of the type designated, the springs act to exert a force against the levers which urges the pressure plate into engagement with the driven member. When the clutch is being disengaged, the springs are compressed which increases the resistance to clutch release. The present invention provides a clutch which requires less initial effort to disengage and which effort decreases as the degree of disengagement increases.

A problem inherent in conventional spring and lever clutches where the springs are disposed substantially parallel to the central axis of the driven member is that when wear of the friction facing occurs and the pressure plate correspondingly moves closer toward the flywheel, the levers pivot, the springs expand and the plate load during engagement decreases. This results in a corresponding decrease in torque capacity which is an undesirable result.

The present invention overcomes this feature by having the spring act through a moment arm which varies in effective length such that as wear occurs, the effective length of the moment arm increases at a rate approximating the rate of loss of spring force so that the plate load during engagement remains substantially constant regardless of friction facing wear.

One clutch design of this type is shown in U.S. Pat. No. 3,276,555 which shows a friction clutch of the spring and lever type having the spring acting through a moment arm which varies in effective length. The present invention, by placing the lever pivot point inside the coverplate, provides an improvement over this and other prior art designs in that the assembly is more compact, there are no protrusions that could be dangerous when revolving and operating parts are better protected from outside contaminants such as dust, dirt, and other substances likely to cause abrasion and wear.

BRIEF DESCRIPTION OF THE DRAWINGS

FIG. 1 is a top view of a clutch assembly embodying the features of the present invention.

FIG. 2 is a side view of the clutch shown in FIG. 1.

FIG. 3 is a top view of an alternative embodiment of a clutch assembly embodying the features of the present invention.

FIG. 4 is a detailed view of a portion of FIG. 1.

FIG. 5 is a sectional view taken along the lines 5—5 of FIG. 4.

FIG. 6 is a side view of an alternative embodiment of a clutch embodying the features of the present invention.

FIG. 7 is a detailed view rotated 90° of a portion of FIG. 6.

FIG. 8 is a perspective view of that portion of the coverplate where the spring cups are mounted.

Referring now particularly to FIGS. 1 and 2, a clutch is shown generally at 10. The clutch 10 includes a driven member 11 including an internally splined hub 12 which is adapted to be drivingly connected to a splined shaft (not shown). The driven member 11 has a central axis 13 and also includes a disc 15 which extends radially from and is connected to the splined hub 12. A drive assembly 16 is also shown which includes basically, a driving member 17, here shown as a flywheel, a reaction member 20 connected to said driving member and a pressure plate 21 disposed coaxial with said driven member 11 and the driving member 17 and axially between the reaction member 20 and the driving member 17. The disc 15 has a pair of annular friction facings 22, one being suitably secured on either axial side of the disc at opposed positions from one another and both being spaced radially outwardly from hub 12.

The reaction member 20 is bolted to the flywheel 17 by a plurality of bolts as at 25. The pressure plate 21 is axially movable relative to the driving member 17 and includes a plurality of circumferentially spaced driving lugs 26 which are adapted to project through corresponding openings 27 defined by the reaction member.

The reaction member 20 includes a first wall portion 30 axially spaced from the driving member 17. The wall portion 30 has axially opposed front and rear surfaces 31 and 32 respectively.

The reaction member 20 also includes a second wall portion 35 disposed axially inwardly of said first wall portion 30 between said first wall portion 30 and said driving member 17. The reaction member 20 further includes a web portion 36 joining said first and second wall portions 30 and 35. The web portion 36 defines apertures 37 through which lever means, to be more fully described hereafter, extend. The apertures 37 include a reaction surface or seat 40 which carries a pair of projections 41 which are used for positioning purposes as will be described later. The reaction end, as best seen in FIG. 8, forms a wide base for preventing pivoting of a spring cup mounted thereon and described later. The reaction end 40 includes a first lateral offset surface 42 from which the projections 41 extend and a second lateral offset surface 43. A plurality of circular housings 45 are also formed in the reaction member 20.

Means are provided for moving the pressure plate 21 and thereby the driven member 11 axially into and out of engagement with the driving member 17 and includes a plurality of lever means 46, here shown as release levers. Any suitable number of release levers 46 may be used, and in FIG. 1, three are illustrated. The release levers 46 are carried by the reaction member 20 and are pivotally connected to the reaction member 20 by pivot pins 47. The levers 46 are connected in such a way as to have their pivot point 50 disposed axially between the front surface 31 of the wall portion 30 and the driving member 17, thus providing a compact structure with no dangerous external protrusions and which shields and protects the pivot assembly from outside contaminants such as dust, dirt and other substances likely to cause abrasion and wear.

The levers 46 include a radially inner end 51 which is adapted to be contacted by a release bearing, not shown, and a radially outer end 52. The lever outer end 52 is formed with protrusions 55 on each side and is a close but free fit in a machine slot 56 defined by the pressure plate driving lug 26. The levers 46 are pivoted such that rotation about the pivot pin 47, in a first or clockwise direction, is adapted to urge the pressure plate 21 and driven member 11 into engagement with the driving member 17. Rotation of the levers 46 in a second or counterclockwise direction about the pivot pin will move the pressure plate 21 and driven member 11 axially away from and out of engagement with the driving member 17. Each lever 46 defines an aperture 57 including an action end 60. The action end 60 includes tapered edges 59 which form a fulcrum and a pair of projections 61 are formed on each edge 59 and act as positioning means.

Resilient means 62 are shown disposed between the reaction member 20 and the lever means 46 at an angle to the central axis 13 of the driven member 11. The resilient means 62 act on the lever means at an action point radially inwardly displaced from the pivot point 50 to urge the lever 46 to rotate in a first or clutch engaging direction. The resilient means 62, here shown as coil springs include an action end 65 and a reaction end 66.

The springs 62 prove most effective when the centerline or line of force of them passes through the midportion of reaction seat 40 and the center of tapered edges 59. For this reason, the springs 62, at their reaction ends 66 are piloted in positioning cups 67, best shown in FIGS. 4 and 5. The cups 67 are generally oval in configuration with a side flange 70 extending around the periphery. The cups 67 define a pair of rectangular apertures 71 which are adapted to receive the projections 41 extending therethrough. The projections 41 serve to locate both the cups 67 and the spring ends 66 with respect to the cup 67 to prevent any relative lateral movement therebetween. The laterally offset surfaces 42 and 43 form a wide base for the positioning cup 67 and prevent any pivoting of the positioning cup about the reaction surface. This minimizes the tendencies of the springs to buckle and cause instability at high R.P.M. The springs 62 are piloted at their action ends 65 by the projections 61 which enter and position the action ends 60. The springs at their action end 65 are allowed to pivot about the fulcrum formed by the tapered edges 59.

When additional plate load is required, a plurality of biasing means 72 are disposed between the reaction member 20 and the pressure plate 21 to urge said pressure plate and said driven member into engagement with said driving member directly as opposed to acting through the lever means 46.

In operation, when the vehicle operator wishes to disengage the clutch, a release bearing, not shown, moves axially toward the levers 46 until it engages the levers at their radially inner end 51. When the force of the release bearing overcomes the force exerted by the resilient means 62 on the levers 46, the levers are then forced to pivot about the pivot pins 47 in the second or counterclockwise direction. The radially outer end 52 of the levers 46 by virtue of its position in the slot 56 forces the pressure plate 21 axially away from the driving member 17 and into a clutch disengaged position.

When the operator wishes to engage the clutch, force against the release bearing is removed allowing the spring 62 to exert a force against the lever 46 causing it to pivot about the pivot pin 47 in a first or clockwise direction.

The distance from the line of force of the spring acting through fulcrum 59 to the pivot point 50 is greater than the distance from the pivot point 50 to the protrusions 55 which are formed on the release lever 46 and act on the pressure plate 21. Because of this, the clockwise urging force on the lever 46 from the resilient member 62 enjoys a mechanical advantage over the counterclockwise reaction loads imposed on the lever 46 by the pressure plate 21. In addition, there is an appreciable mechanical advantage in the disengagement of the clutch for the fulcrum 59 is closer to the pivot point 50 than is the radial inner end 51 of the lever 46 which is engaged by the release bearing.

As wear of the friction facings 22 occurs, the pressure plate 21 moves axially toward the driving member 17. At the same time the lever 46 pivots about pivot pin 47 in a clockwise direction and the action end 65 of spring 62 extends. This results in the angle of the line of force of the spring moving radially inward toward the axis 13.

As the spring 62 is elongated and compressed as occurs respectively during clutch engagement and disengagement, the spring flexes radially about the reaction surface 40, thereby changing the direction of the force exerted by the spring on fulcrum 59 which moves along an arc relative to the pivot point 50. As the lever 46 rotates clockwise, the effective distance from the pivot point 50 to the point where the force of the spring is applied to the lever is increased.

The effective distance from the pivot point 50 to the protrusion 55 remains substantially constant since the line of force of the pressure plate 21 is always in a straight line parallel to the axis of rotation of the clutch and the arc through which 55 moves is very small. The fulcrum 59 travels so that the mechanical advantage of the spring 62 is varied according to the angular position of the lever 46 and the corresponding angle of force of the spring 62.

As friction facings 22 wear, the release levers 46 must pivot further in a clockwise direction to engage the pressure plate 21 with the disc 15, thereby requiring the spring 62 to elongate and lose compression. To compensate for this reduced compression, the mechanical advantage of the spring 62 is increased due to the increase in the effective distance from the fulcrum 59 to the pivot point 50. This system may be varied by chosing the proper dimensions and springs to have the compensating factors directly proportional to the loss of compression of the springs 62 so that the engaging pressure between the driven member 11 and the driving member 17 is substantially uniform throughout the life of the friction facing 22.

One advantage of this system is that less load is required for clutch disengagement for as springs 62 are compressed, increasing their force, the effective distance from the fulcrum 59 to the pivot point 50 is decreased while the distance from the radially inner end 51 to the pivot point 50 changes very little. This results in an additional mechanical advantage for the disengagement of the clutch.

FIGS. 6 and 7 show an alternative embodiment of a clutch including the principles of the present invention previously described but which utilizes a strap-type drive as opposed to the lug drive shown in FIGS. 1 and 2. More specifically, a pressure plate 75 has an annular configuration with a plurality of bosses 76 formed adjacent its outer peripheral edge and extending axially away from the driving member 17. The bosses 76 are adapted to carry fasteners 77 which may extend partly into aligned openings 80 provided in a reaction member 82. Flexible strap members 81 are adapted to interconnect the pressure plate 75 with the reaction member 82 for positive centralization and rotation therewith. One end 85 of each strap 81 is secured to the boss 76 by the fastener 77. The opposite end 86 of strap 81 is secured by a fastener 87 to the reaction member 82.

The operation of the spring and lever assembly of the clutch shown in FIGS. 6 and 7 is substantially the same as the operation of the spring and lever assembly shown in FIGS. 1 and 2 described previously.

FIG. 3 shows an alternative embodiment of a clutch including the features of the present invention which clutch includes six levers 90 with a single resilient member 91 disposed between the lever 90 and a reaction member 92.

Thus it has been shown that the present invention provides a clutch assembly of the spring and lever type in which the springs act through a moment arm which varies in effective length as wear occurs and when the clutch is released. It has also been shown that the present invention provides such an assembly in a structure which is more compact than prior art devices, has no dangerous protrusions and which shields the pivot action of the lever means from outside contaminants thus increasing the life of the assembly.

Various of the features of the invention have been particularly shown and described. However, it should be obvious to one skilled in the art that various modifications may be made therein without departing from the scope of the invention.

What is claimed is:

1. A clutch comprising in combination a driven member; a drive assembly including a driving member, a reaction member connected to said driving member including a first wall portion axially spaced from said driving member, said wall portion having axially opposed front and rear surfaces, a pressure plate disposed coaxially with and intermediate said driving member and said wall portion, said pressure plate adapted to be moved into and out of engagement with said driven member, means connecting said pressure plate and said reaction member for unitary rotation and relative axial movement, lever means pivotally connected to said reaction member at a pivot point disposed between said front surface of said wall portion and said driving member, said lever means adapted to engage said pressure plate and to rotate about said pivot point in a first direction to urge said pressure plate axially into engagement with said driven member and in a second direction to urge said pressure plate axially out of engagement with said driven member, resilient means disposed between said reaction member and said lever means acting upon said lever means at an action point displaced from said pivot point whereby the effective distance between said action point and said pivot point is constantly increased as said lever means is rotated in said first direction, at least one reaction surface defined by said reaction member, a positioning cup carried by said reaction surface adapted to engage said resilient means and a projection extending from said reaction surface through said positioning cup to locate said cup and said resilient means.

2. A clutch as in claim 1 including a second wall portion defined by said reaction member axially disposed between said first wall portion and said driving member and disposed radially inwardly of said first wall portion.

3. A clutch as in claim 2 including a web portion defined by said reaction member joining said first and second wall portions.

4. A clutch as in claim 1 including apertures defined by said reaction member, said apertures including said reaction surface and being adapted to receive said lever means extending radially inwardly from said pivot point through said apertures.

5. A clutch as in claim 4 including apertures defined by said lever means, said apertures including an action point whereby said resilient means are disposed between said action point and said reaction surface.

6. A clutch as in claim 4 in which said resilient means lie within and said lever means extend through, said apertures defined by said reaction member.

7. A clutch as in claim 1 including biasing means disposed between said reaction member and said pressure plate adapted to urge said pressure plate into engagement with said driven member.

8. A clutch as in claim 1 in which said means connecting said pressure plate and said reaction member includes a flexible strap having one end connected to said pressure plate and another end connected to said reaction member.

9. A clutch as in claim 1 in which said positioning cup includes a flange portion encircling said resilient means.

10. A clutch as in claim 5 including locating means for said resilient means carried by said action point and adapted to retain said resilient means in a predetermined position.

11. A clutch as in claim 10 in which said locating means includes a projection extending from said action point through a portion of said resilient means.

12. A clutch as in claim 1 in which said resilient means comprises a single coil spring disposed between said reaction member and each of said lever means.

13. A clutch as in claim 1 in which said resilient means comprises a plurality of coil springs disposed between said reaction member and each of said lever means.

14. A clutch as in claim 9 in which said positioning means includes a surface laterally offset from the plane of said reaction surface to form a stable base for said positioning cup.

15. A clutch as in claim 10 in which said action point is apex shaped to provide a pivotal line of contact for said resilient means.

* * * * *